(12) United States Patent
Hackeloeer et al.

(10) Patent No.: US 10,467,467 B2
(45) Date of Patent: Nov. 5, 2019

(54) METHOD, SYSTEM AND COMPUTER PROGRAM FOR AUTOMATICALLY DETECTING TRAFFIC CIRCLES ON DIGITAL MAPS

(71) Applicant: Bayerische Motoren Werke Aktiengesellschaft, Munich (DE)

(72) Inventors: Andreas Hackeloeer, Munich (DE); Klaas Klasing, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 85 days.

(21) Appl. No.: 15/715,372

(22) Filed: Sep. 26, 2017

(65) Prior Publication Data

US 2018/0018513 A1 Jan. 18, 2018

Related U.S. Application Data

(63) Continuation of application No. PCT/EP2016/055417, filed on Mar. 14, 2016.

(30) Foreign Application Priority Data

Apr. 2, 2015 (DE) .................. 10 2015 206 002

(51) Int. Cl.
*G06K 9/00* (2006.01)
*G06K 9/46* (2006.01)
(Continued)

(52) U.S. Cl.
CPC ....... *G06K 9/00476* (2013.01); *G06K 9/4604* (2013.01); *G06K 9/469* (2013.01); *G06K 9/6892* (2013.01); *G01C 21/32* (2013.01)

(58) Field of Classification Search
CPC .. G06K 9/00476; G06K 9/4604; G06K 9/469; G06K 9/6892; G01C 21/32
See application file for complete search history.

(56) References Cited

U.S. PATENT DOCUMENTS

| 6,532,304 B1* | 3/2003 | Liu | G01C 21/32 382/203 |
| 8,081,820 B2* | 12/2011 | Davis | G06K 9/469 382/173 |
| 2015/0153183 A1* | 6/2015 | Kadous | G01C 21/32 701/532 |

FOREIGN PATENT DOCUMENTS

EP  1 748 281 A2  1/2007

OTHER PUBLICATIONS

Guo et al. "A Method for Classification of Convex Polygons." Journal of Convergence Information Technology 2.3 (2007). (Year: 2007).*

(Continued)

*Primary Examiner* — Katrina R Fujita
(74) *Attorney, Agent, or Firm* — Crowell & Moring LLP

(57) ABSTRACT

A computer-implemented method for detecting a traffic circle on a digital map, the method comprising: detecting a cycle within a road graphic of the digital map; calculating a similarity of an internal angle of a corner of a polygon, which represents the geometry of the cycle, to an internal angle of a corresponding corner of a reference polygon; calculating a similarity indicator on the basis of the calculated similarity of the internal angle of all the corners of the polygon of the detected cycle; and, if the similarity indicator exceeds a predefined threshold value, defining the detected cycle as a traffic circle on the digital map.

13 Claims, 4 Drawing Sheets

(51) Int. Cl.
*G06K 9/68* (2006.01)
*G01C 21/32* (2006.01)

(56) References Cited

OTHER PUBLICATIONS

Kim et al. "Similarity measurement for aggregation of spatial objects." Proceedings of the 2005 ACM symposium on Applied computing. ACM, 2005. (Year: 2005).*
Manay et al. "Matching flexible polygons to fields of corners extracted from images." International Conference Image Analysis and Recognition. Springer, Berlin, Heidelberg, 2007. (Year: 2007).*
Tung et al. "A two-stage framework for polygon retrieval." Multimedia Tools and Applications 11.2 (2000): 235-255. (Year: 2005).*
Savino, S. et al., "Road Junction Generalization in Large Scale Geodatabases," Urban and Regional Data Management—Krek, Rumor, Zlatanova & Fendel (eds): UDMS 2009 Annual, Taylor & Francis Group, London, pp. 205-214, XP008180357 (Ten (10) pages).
Touya, G. et al., "A Road Network Selection Process Based on Data Enrichment and Structure Detection," Transactions in GIS, vol. 14, No. 5, Oct. 23, 2010, Blackwell Publishing Ltd., pp. 595-614, XP055274562 (Twenty (20) pages).
Chalmeta, R. et al., "Measuring Regularity of Convex Polygons," Computer-Aided Design, vol. 45, No. 2, Dec. 31, 2013, Elsevier Ltd., pp. 93-104, XP028952928 (Twelve (12) pages).
German-language Search Report issued in counterpart German Application No. 10 2015 206 002.0 dated Feb. 24, 2016 with partial English translation (12 pages).
International Search Report (PCT/ISA/210) issued in PCT Application No. PCT/EP2016/055417 dated Jun. 9, 2016 with English translation (5 pages).
German-language Written Opinion (PCT/ISA/237) issued in PCT Application No. PCT/EP2016/055417 dated Jun. 9, 2016 (8 pages).
Sukumaran et al., "Quantitative Characterisation of the Geometry of Discrete Particles", Géotechnique, Dec. 31, 2001, pp. 1-9, XP055275367.
Maceachren, "Compactness of Geographic Shape: Comparison and Evaluation of Measures", Geografiska Annaler, Series B, Human Geography, Dec. 31, 1985, pp. 53-67, vol. 67, No. 1, XP055275154.

* cited by examiner

METHOD, SYSTEM AND COMPUTER PROGRAM FOR AUTOMATICALLY DETECTING TRAFFIC CIRCLES ON DIGITAL MAPS

CROSS REFERENCE TO RELATED APPLICATIONS

This application is a continuation of PCT International Application No. PCT/EP2016/055417, filed Mar. 14, 2016, which claims priority under 35 U.S.C. § 119 from German Patent Application No. 10 2015 206 002.0, filed Apr. 2, 2015, the entire disclosures of which are herein expressly incorporated by reference.

BACKGROUND AND SUMMARY OF THE INVENTION

The invention relates to a method, a system, and a computer program for automatically detecting traffic circles in digital maps. In particular, the invention relates to a non-semantic automatic detection of traffic circles in digital maps.

Various applications which are based on digital maps, e.g. digital navigation systems, require an automatic detection of structures in a digital map. By way of example, if the digital map is changed, the automatic detection of structures may yield the ability to automatically detect changes that emerge from different map versions by one producer and/or from maps from different producers. In particular, the automatic detection of traffic circles, also known as roundabouts, in a street network of a digital map may lead to changes from an intersection to a traffic circle and/or modeling differences of a traffic circle between two maps from different producers being captured. To this end, a semantic attribute from the metadata of a structure of the digital map is often used to, for example, automatically detect or identify a traffic circle. If the information about the traffic circles in the digital map is stored semantically therein, then a traffic circle can be detected by way of the semantic information. To this end, a corresponding attribute of the metadata may be read. In the simplest case, this may be a Boolean value which is assigned to an intersection point or a street segment and which specifies whether the relevant structure belongs to a traffic circle. However, the evaluation of a semantic attribute for identifying a traffic circle in a digital map is only successful if this information is provided and correctly stored in the data model of the map. This may prevent an identification of traffic circles in digital maps if either this semantic attribute is not present in the digital map or this attribute is present but not correctly captured for some or all traffic circles.

It is therefore an object of the invention to provide an improved detection of traffic circles in digital maps. In particular, it is an object of the invention to provide an improved non-semantic automatic detection of traffic circles in digital maps.

According to the invention, this object is achieved by a method, a system, and a computer program in accordance with embodiments of the invention.

A method according to the invention serves to detect a traffic circle in a digital map. The method comprises a topological detection or determination of a cycle within a street graph of the digital map. A "cycle" within the scope of the present document should be understood to mean a path in the street graph of a digital map, in which the start and end vertex are the same and all vertices, apart from the identity of start vertex and end vertex, occur at most once. Such a cycle may be considered to be a candidate for a traffic circle if it consists only of trivalent and bivalent vertices, i.e. vertices from which exactly three or exactly two edges emerge.

The method calculates a similarity of an internal angle of a corner of the polygon, which corresponds to the cycle, with respect to an internal angle of a corresponding corner of a reference polygon. By way of example, the reference polygon can be a polygon which approximates a circle. By way of another example, the reference polygon can be a polygon which has the same number of corners as the polygon of the detected cycle. In general, the reference polygon can be a polygon which has a similarity to a circle and/or which is suitable for determining the similarity to the geometric form of the detected cycle. A similarity indicator is calculated on the basis of the calculated similarity of the internal angles of all corners of the polygon of the detected cycle in comparison with the internal angles of the corners of the reference polygon. If the similarity indicator exceeds a predefined threshold, the detected cycle is set as a traffic circle in the digital map.

By calculating a similarity indicator on the basis of the similarity of the interior angles of all corners of the polygon of a cycle to the interior angles of a reference polygon, it is possible to detect a traffic circle without semantic information. The method is able to automatically detect the traffic circle on the basis of a street graph in the digital map and set the detected cycle as a traffic circle. As a result of using a threshold, it is possible to efficiently exclude possible cycles which have a geometric similarity to a traffic circle that is too low. As a result, it is possible to ensure that possible errors in the topological detection of the traffic circles are reduced or even excluded.

In accordance with an advantageous configuration, the method may comprise determining a seed point in the street graph, wherein the seed point is a trivalent vertex of a street graph of the digital map. Proceeding from the determined seed point, a cycle can be determined within the street graph of the digital map by a breadth-first search or a depth-first search. Each possible path through the graph proceeding from the seed point is tracked at the latest until the detection of a cycle, i.e. in the case of an identity of start vertex and end vertex, for as long as the condition is satisfied that it only leads over trivalent or bivalent vertices and does not include any vertex which has already been visited. By way of example, an edge of a trivalent vertex may represent an entrance or exit path of the traffic circle. The two further edges of the trivalent vertex may, for example, represent a portion of the path along which it is possible to traverse the traffic circle. By using a trivalent vertex as a seed point, it is possible to efficiently determine an entrance path or exit path of a traffic circle. Hence, the search for cycles in the digital map can be calculated more efficiently.

In accordance with a further advantageous configuration, the reference polygon may be a polygon which has the same number of edges as the polygon of the detected cycle, and approximates a circle. Instead of comparing the similarity of a polygon of a cycle to a circle, a polygon which approximates the circular form of a traffic circle may be used as a reference. By using a reference polygon, it is possible to efficiently determine the similarity between the polygon of a cycle and the reference polygon. Hence, it is possible to increase the efficiency when calculating the similarity.

In accordance with a further advantageous configuration, the calculated similarity of the interior angle of each corner can be weighted by the geometric length of the edges of the polygon that belongs to the interior angle. Using this, the accuracy of the similarity determination can be efficiently improved. Further, the comparability of the similarity indicator can be increased.

In accordance with a further advantageous configuration, the detected cycle may consist only of vertices which are either trivalent or lead to a trivalent vertex again via one or more bivalent vertices. Using this, it is possible to efficiently restrict the detection of cycles to cycles which are possible candidates for traffic circles. As a result, the computational outlay for detecting cycles can be efficiently reduced.

In accordance with a further advantageous configuration, the similarity indicator CI can be calculated as follows:

$$CI = \sum_{i=1}^{n} \frac{l_{i-1} + l_i}{2l} \cdot \left(1 - \frac{|\alpha_i - \alpha_c|}{360° - \alpha_c}\right)$$

where $\alpha_c$ is the interior angle of the reference polygon,
where $\alpha_i$ is the interior angle of a corner i of the polygon of the cycle,
where n is the number of corners of the polygon of the cycle,
where $l_i$ is the geometric length of the edge, proceeding from the corner i of the polygon of the cycle,
where $l_{i-1}$ is the length of the edge, proceeding from the corner i-1 of the polygon of the cycle, and
where l is the overall length of all edges of the polygon of the cycle.

Using this, it is possible to efficiently determine a weighted similarity of the interior angles of the polygon of a cycle. The calculation of the similarity indicator facilitates a uniform determination of the similarity of the geometric form of a cycle to the reference polygon, e.g. a polygon which ideally approximates a circle.

A system according to the invention serves to detect a traffic circle in a digital map, wherein the system is adapted to carry out the above-described method.

A computer program according to the invention comprises instructions which execute the above-described method when said instructions are executed on a computer.

Within the scope of the following document, a computer program or a computer program product should be understood to mean that this may also be a program element and/or a computer readable medium which comprises instructions for controlling a computer system to execute the above-described method.

The computer program may be embodied as computer-readable code in any suitable programming language, such as e.g. JAVA, C, and/or C++, and may be stored on a computer-readable medium (removable disk and/or volatile and/or non-volatile memory). The code may be adapted to program a computer or any other programmable appliance in order to obtain the intended functions. The computer program may be downloaded and/or provided by way of a network such as, for example, the Internet.

The invention can be realized by means of a computer program. However, the invention can also be realized by means of one or more electronic circuits or hardware modules, and/or by a combination of software modules and hardware modules.

The invention is based on the considerations presented below.

The method according to the invention is able to calculate a similarity of the geometry of a cycle within a road network that is described by a polygon, to a polygon having the same number of corners and coming closest to an ideal circle. It can be used within the scope of a two-stage method to identify traffic circles in a digital map. Here, in a first step, candidates for traffic circles are determined by virtue of searching for cycles in the digital map that correspond topologically to a traffic circle. In a second step, the geometric similarity to an ideal circular polygon with the same number of corners is determined for each candidate or cycle with the aid of a similarity metric or similarity indicator. If this similarity exceeds a specific, freely selectable threshold, for example 60%, the candidate is classified and/or set as a traffic circle.

In digital maps which only describe the topology and the geometry of the road network, it is nevertheless possible to identify traffic circles using the method according to the invention. The traffic circles detected thus can subsequently be mapped onto one another within the scope of a matching analysis, for example in order to reference the entrance and exit points over a plurality of maps. Such map-agnostic referencing facilitates, for example, the maintenance of learned location-related information when replacing and/or updating the digital map, and the comparison of maps for the purposes of quality assurance of automobile navigation systems.

Further features of the invention emerge from the claims, the figures, and/or the description of the figures. All the features and feature combinations mentioned above in the description and all features and feature combinations mentioned in the description of the figures and/or shown only in the figures are usable not only in the respectively specified combination, but also in other combinations or else on their own.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
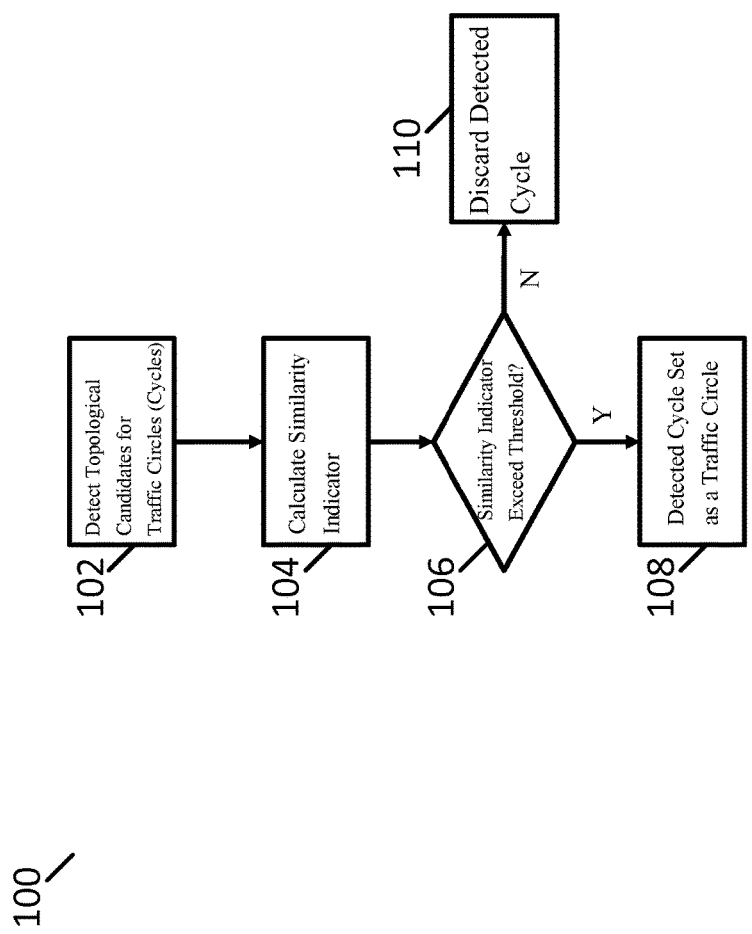
FIG. 1 is a flowchart of a method for automatically detecting traffic circles in digital maps.

In detail, FIG. 1 shows a flowchart 100 of a method for non-semantic automatic detection of traffic circles in digital maps. The method is able to facilitate the detection of traffic circles on the basis of only topological and geometric information in a digital map. In this way, it is also possible to use digital maps for detecting traffic circles which were not created especially for street navigation, such as, for example, the maps of the Authoritative Topographic-Cartographic Information System (ATKIS) from the surveying authorities of the federal states of the Federal Republic of Germany. Moreover, it is also possible to uncover errors in the semantic labeling of traffic circles in digital maps which semantically describe traffic circles and hence improve the quality of these maps.

In a first step of the method, it is possible to determine or detect 102 topological candidates for traffic circles in a digital map. To this end, it is possible, in each case proceeding from a seed point, e.g. a trivalent vertex in a street graph, to detect a cycle which only consists of vertices which either are trivalent, i.e. connected to three edges, or lead back to a trivalent vertex via a bivalent vertex, i.e. a vertex that has two edges. Trivalent vertices are able to define entrance and/or exit points of the traffic circle. A first edge of an exemplary trivalent vertex can be an edge which defines an entrance point for a traffic circle and the further edges of the exemplary trivalent vertex can define connections within the traffic circle. Proceeding from the seed point, it is possible, to this end, for example by means of a depth-first search, to search for a path which yields a cycle and only consists of trivalent or bivalent vertices. Paths through the graph which represent candidates for a cycle may be tracked in this case until either the cycle condition, e.g. initial vertex equals end vertex, or a termination criterion, e.g. a univalent vertex or an already visited vertex, is satisfied. This can be carried out for all possible seed points until all possible cycles are found.

Figure 2:
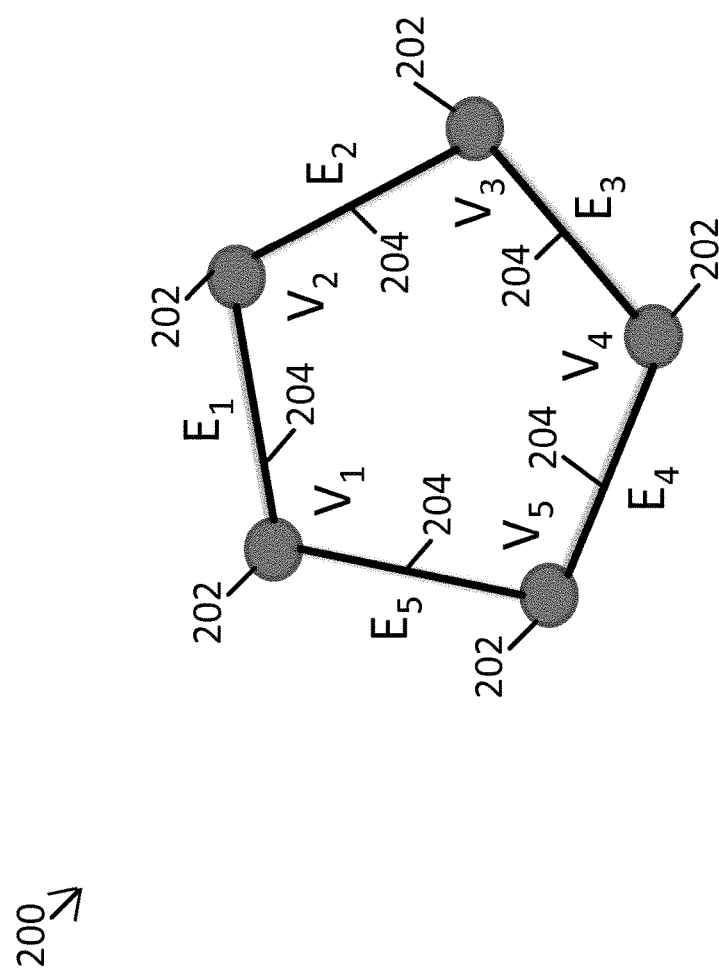
FIG. 2 shows a cycle.

FIG. 2 shows an exemplary cycle 200 in a topological layer of a digital map. The topological layer of the digital map may describe a street graph. From the view of the topological layer in the digital map, a cycle is therefore a subgraph of the street graph, which consists of vertices 202 and edges 204, with an edge 204 in each case connecting two vertices 202. In the example of FIG. 2, the cycle consists of five vertices 202, which are denoted by V1, V2, V3, V4, and V5 in FIG. 2, and five edges 204, which are denoted by E1, E2, E3, E4, and E5 in FIG. 2.

The second step of the method comprises a similarity method which calculates 104 a similarity indicator. A geometric similarity of the polygon provided by the cycle to a polygon with the same number of corners, preferably a polygon with the same number of corners that ideally approximates a circle, can be calculated for each candidate or cycle that was detected in the first step.

As already described above, a cycle from the view of the topological layer in the digital map is a subgraph of the street graph which consists of vertices and edges, with an edge connecting two vertices in each case. The digital map can also comprise a geometric layer in addition to the topological layer. The geometric layer of the digital map can assign a so-called polyline, which is described by a sequence of two-dimensional coordinates that, for example, are connected linearly, to each edge of the street graph, e.g. each edge 204 of the cycle in FIG. 2. Therefore, it is analogously possible to assign a polygon, i.e. a closed sequence of polylines which surround an area, to a cycle by way of the geometric layer of the digital map. The polygon can approximate the geometric course of the edges of the cycle.

Figure 3:
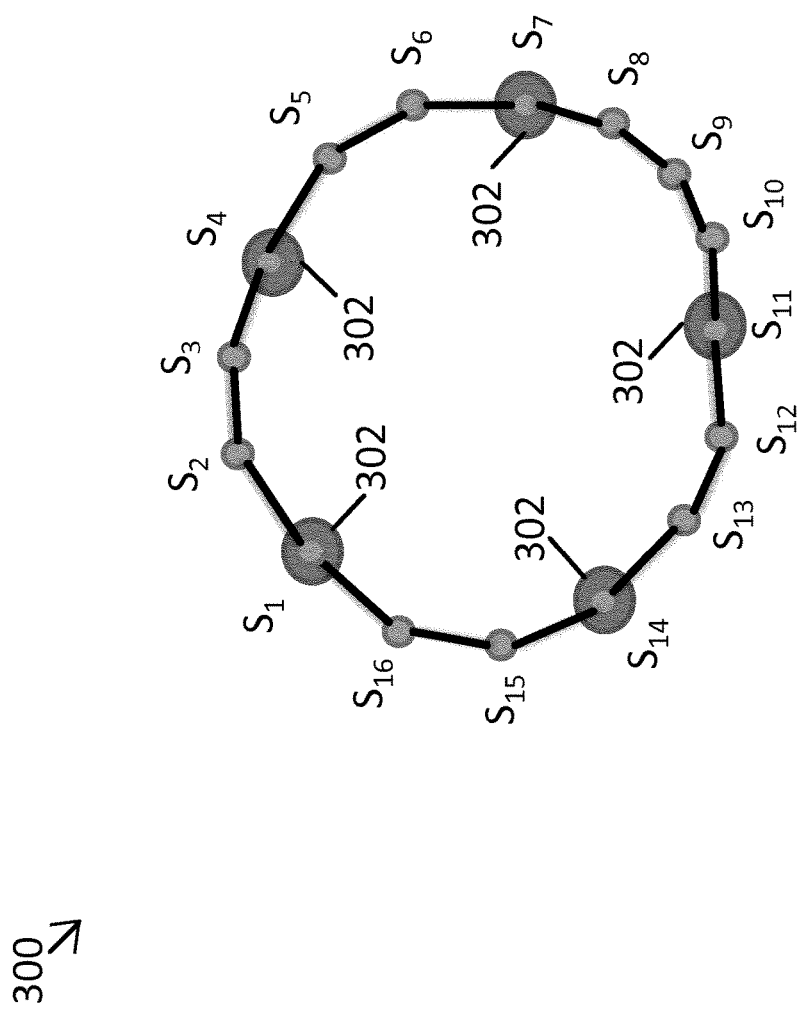
FIG. 3 shows a polygon for the cycle from FIG. 2.

FIG. 3 shows a polygon 300 for the cycle 200 from FIG. 2, with the polygon 300 approximating the geometric course of the edges 204 of the cycle 200. For a clearer representation, the vertices 302 correspond to the vertices 202 from FIG. 2. Geometrically, each edge of the cycle, e.g. each edge 204 from FIG. 2, is decomposed into a sequence of so-called shape points. There must be at least two shape points per edge (start point and endpoint). However, an edge is often decomposed into more than two shape points. The geometry of an edge emerges by virtue of connecting each shape point to its direct neighbor by way of a straight line. Then, a so-called polyline is created therefrom. If a polyline leads back to itself such that the start point and endpoint coincide, a polygon which surrounds an area may be created therefrom.

In the example of FIG. 3, the edge E1 from FIG. 2 is decomposed into the shape points S1, S2, S3, and S4. Hence, the shape points S1, S2, S3, and S4 form a first polyline of the polygon 300. The edge E2 is decomposed into the shape points S4, S5, S6, and S7. The shape points S4, S5, S6, and S7 therefore form a second polyline of the polygon 300. The edge E3 is decomposed into the shape points S7, S8, S9, S10, and S11. The shape points S7, S8, S9, S10, and S11 therefore form a third polyline of the polygon 300. The edge E4 is decomposed into the shape points S11, S12, S13, and S14. The shape points S11, S12, S13, and S14 therefore form a fourth polyline of the polygon 300. The edge E5 is decomposed into the shape points S14, S15, S16, and S1. The shape points S14, S15, S16, and S1 therefore form a fifth polyline of the polygon 300. The endpoint of the fifth polyline coincides with the start point of the first polyline. The polygon 300 with the shape points S1 to S16 has been created. Further, at each shape point S1 to S16, the polygon 300 of the cycle 200 comprises a corner which has an interior angle.

It is known that a polygon with n corners that ideally approximates a circle has the following interior angle $\alpha_c$ at each corner:

$$\alpha_c = \frac{n-2}{n} \cdot 180°$$

By way of example, the interior angle for an ideal circular triangular polygon, i.e. an equilateral triangle, is 60 degrees and it is 90 degrees for an ideal circular quadrilateral polygon, i.e. a square. With increasing number of corners, the polygon approaches an interior angle of 180 degrees at each corner, without ever reaching the 180 degrees.

A polygon, optionally a self-crossing polygon, may be ever more similar to a circle, the closer the interior angles thereof are to the interior angle of an ideal circle-like polygon with the same number of corners. To this end, each interior angle of the polygon can be weighted by the path associated therewith.

The similarity indicator or circularity index (CI) is determined as follows:

$$CI = \sum_{i=1}^{n} \frac{l_{i-1} + l_i}{2l} \cdot \left(1 - \frac{|\alpha_i - \alpha_c|}{360° - \alpha_c}\right)$$

where $\alpha_c$ is the interior angle of the ideal circular polygon, $\alpha i$ is the interior angle of a corner i of the polygon of the cycle, n is the number of corners of the ideal circular polygon or of polygon of the cycle, li is the length of the edge, proceeding from the corner i of the polygon of the cycle, li−1 is the length of the edge, proceeding from the corner i−1 of the polygon of the cycle, and l is the overall length of all edges of the polygon of the cycle. By way of example, the first corner has an angle α1 and an edge l1, which proceeds from the first corner. The last edge 1n can be denoted by l0 in order to simplify the calculation of the weighting term $$\frac{l_{i-1} + l_i}{2l}.$$

The overall length l can be calculated as follows:

$$l = \sum_{i=1}^{n} l_i$$

The overall length l can be calculated as the sum of the lengths of each edge $l_i$ of a polygon of a cycle with n corners.

The geometric similarity can be calculated by comparison of the interior angles between a polygon that describes the geometry of a cycle and a polygon having the same number of corners that ideally approximates a circle. In the process, the difference between a present interior angle $\alpha_i$ of the polygon of the cycle and an expected interior angle $\alpha_c$ of the ideal circular polygon is calculated. The difference between the present interior angle of the polygon of the cycle and the expected interior angle of the ideally circular polygon may be as large as the difference between 360 degrees and the expected angle in the most inexpedient case. In this case, the quotient $$\frac{|\alpha_i - \alpha_c|}{360° - \alpha_c}$$

is one, and hence the similarity $$\left(1 - \frac{|\alpha_i - \alpha_c|}{360° - \alpha_c}\right)$$

is zero. The similarity can be weighted by the relevant path component of the overall path of the edges of the polygon by using the aforementioned weighting term. By weighting the similarity of an interior angle, it is possible to efficiently determine the component of the similarity of an interior angle of the overall index.

Two examples of how the similarity between the polygon of a detected cycle and an associated ideal circle-like polygon is calculated are described below. In the first example, the detected cycle has the same geometric form as the ideal circle-like polygon. In the second example, the detected cycle has the geometric form of a specific rhombus.

First Example: The Ideal Circle

In the first example, a cycle which has the geometric form of an ideal circle-like polygon with eight corners is detected. This cycle is compared to an ideal circle-like polygon with the same number of corners. This ideal circle-like polygon serves as a reference for the comparison with the geometric form of the cycle. The interior angle of each corner of the ideal circle-like polygon with eight corners is 135 degrees everywhere. Further, the assumption is made that all paths or edges of the polygon each have a length of 1 meter. Then, the similarity measure for each corner or each interior angle is 1. The overall length of all edges is 8 meter. The weighting for each corner thus is (1+1)/16, i.e. one eighth. Consequently, each weighted similarity measure is one eighth and the sum is exactly one. Expressed differently, the detected cycle corresponds exactly to the reference polygon, i.e. the ideal circle-like polygon with eight corners.

Second Example: A Specific Rhombus

Figure 4:
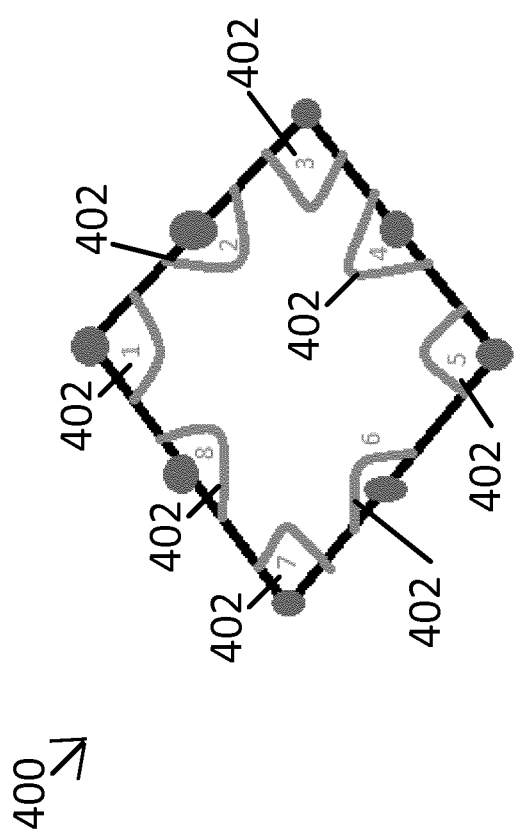
FIG. 4 shows a specific rhombus with the associated interior angles.

A cycle which has the geometric form depicted in FIG. 4 is detected in the second example. In detail, FIG. 4 shows a rhombus 400, in which each rhombus edge consists of two individual edges which are interrupted at the center by a point, e.g. a shape point, and an associated corner. Herein, the interior angles are always alternately 90 and 180 degrees. As depicted in FIG. 4, the interior angles 402 numbered 1, 3, 5, and 7 equal 90°, i.e. $\alpha1=\alpha3=\alpha5=\alpha7=90°$. The interior angles 402 numbered 2, 4, 6, and 8 are 180°, i.e. $\alpha2=\alpha4=\alpha6=\alpha8=180°$. The cycle with the form of the rhombus 400 has eight corners and can likewise be compared to the ideal circle-like polygon with eight corners.

In the case of the 180° angles, the difference from the interior angle of 135° of the ideal circle-like polygon with eight corners is exactly 45°. In the case of the 90° angles, the difference is likewise exactly 45°. From this, a similarity of 80% (1−(45/(360−135))) emerges. The weighting term of the similarity index always has the same value under the assumption that the lengths of the edges of the rhombus 400 and the lengths of the edges of the ideal circle-like polygon are the same. Hence, the similarity is only determined by the similarity of the interior angles, and the similarity indicator has a value of 80%. Hence, the rhombus 400 depicted in FIG. 4 has a similarity of 80% with the ideal circle-like polygon with eight corners.

After calculating 104 the similarity indicator, the method checks 106 whether the calculated value of the similarity indicator exceeds a predefined threshold. Tests have yielded that a selectivity which facilitates a reliable distinction between a real traffic circle and false detections can be obtained using the threshold of approximately 60%. If the similarity indicator exceeds the threshold of approximately 60%, the assumption can be made with a high probability that the detected cycle is a traffic circle.

If the similarity indicator or the value of the similarity indicator exceeds the predefined threshold, the detected cycle can be set 108 as a traffic circle in the digital map. To this end, a corresponding value can be stored in the digital map for the structure of the detected cycle, with the value indicating that the structure is a traffic circle. Advantageously, this can rectify errors in respect of traffic circles in the digital map and automatically add new traffic circles in the map.

If the similarity indicator or the value of the similarity indicator does not exceed the predefined threshold, the detected cycle can be discarded 110. In this case, the detected cycle has a similarity with a traffic circle that is too low and therefore it is not a traffic circle.

LIST OF REFERENCE SIGNS

100 Flow chart
102 Determining a cycle
104 Calculating a similarity indicator
106 Checking whether the calculated similarity indicator exceeds a predefined threshold
108 Setting a detected cycle as traffic circle
110 Discarding a detected cycle
200 Cycle
202 Vertex
204 Edge
300 Polygon
302 Vertex
400 Rhombus
402 Interior angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A computer-implemented method for detecting a traffic circle in a digital map, the method comprising the steps of:
   detecting a cycle within a street graph of the digital map;
   calculating a similarity of an interior angle of a corner of a polygon which represents the geometry of the cycle to an interior angle of a corresponding corner of a reference polygon;
   calculating a similarity indicator on the basis of the calculated similarity of the internal angles of all corners of the polygon of the detected cycle; and
   setting the detected cycle as a traffic circle in the digital map if the similarity indicator exceeds a predefined threshold.

2. The method as claimed in claim 1, further comprising the step of:
   determining a seed point in the street graph,
      wherein the seed point is a trivalent vertex of a street graph of the digital map, and
      wherein the cycle is determined proceeding from the determined seed point within the street graph of the digital map.

3. The method as claimed in claim 2, wherein
   the reference polygon is a polygon which has the same number of edges as the polygon representing the geometry of the detected cycle, and approximates a circle.

4. The method as claimed in claim 3, wherein
   the calculated similarity of the interior angle of each corner is weighted by a length of the edges that belongs to the interior angle.

5. The method as claimed in claim 3, wherein
   the detected cycle only includes vertices which either are trivalent or lead to a trivalent vertex again via one or more bivalent vertices.

6. The method as claimed in claim 3, wherein the similarity indicator (CI) is calculated as follows:

$$CI = \sum_{i=1}^{n} \frac{l_{i-1} + l_i}{2l} \cdot \left(1 - \frac{|\alpha_i - \alpha_c|}{360° - \alpha_c}\right)$$

where $\alpha_c$ is the interior angle of the polygon,
where $\alpha_i$ is the interior angle of a corner i of the polygon that geometrically represents a cycle,
where n is the number of corners of the polygon that geometrically represents a cycle,
where li is the length of the edge, proceeding from the corner i of the polygon that geometrically represents a cycle,
where li−1 is the length of the edge, proceeding from the corner i−1 of the polygon that geometrically represents a cycle, and
where l is the overall length of all edges of the polygon that geometrically represents a cycle.

7. The method as claimed in claim 2, wherein
   the detected cycle only includes vertices which either are trivalent or lead to a trivalent vertex again via one or more bivalent vertices.

8. The method as claimed in claim 1, wherein
   the reference polygon is a polygon which has the same number of edges as the polygon representing the geometry of the detected cycle, and approximates a circle.

9. The method as claimed in claim 1, wherein
   the calculated similarity of the interior angle of each corner is weighted by a length of the edges that belongs to the interior angle.

10. The method as claimed in claim 1, wherein
    the detected cycle only includes vertices which either are trivalent or lead to a trivalent vertex again via one or more bivalent vertices.

11. The method as claimed in claim 1, wherein the similarity indicator (CI) is calculated as follows:

$$CI = \sum_{i=1}^{n} \frac{l_{i-1} + l_i}{2l} \cdot \left(1 - \frac{|\alpha_i - \alpha_c|}{360° - \alpha_c}\right)$$

where $\alpha_c$ is the interior angle of the polygon,
where $\alpha_i$ is the interior angle of a corner i of the polygon that geometrically represents a cycle,
where n is the number of corners of the polygon that geometrically represents a cycle,
where li is the length of the edge, proceeding from the corner i of the polygon that geometrically represents a cycle,
where li−1 is the length of the edge, proceeding from the corner i−1 of the polygon that geometrically represents a cycle, and
where l is the overall length of all edges of the polygon that geometrically represents a cycle.

12. A system for detecting a traffic circle in a digital map, wherein the system comprises a computer executing a computer program to perform the steps of:
    detecting a cycle within a street graph of the digital map;
    calculating a similarity of an interior angle of a corner of a polygon which represents the geometry of the cycle to an interior angle of a corresponding corner of a reference polygon;
    calculating a similarity indicator on the basis of the calculated similarity of the internal angles of all corners of the polygon of the detected cycle; and
    setting the detected cycle as a traffic circle in the digital map if the similarity indicator exceeds a predefined threshold.

13. A computer product comprising a non-transitory computer readable medium containing instructions which, when said instructions are executed on a computer, carry out the steps of:
    detecting a cycle within a street graph of the digital map;
    calculating a similarity of an interior angle of a corner of a polygon which represents the geometry of the cycle to an interior angle of a corresponding corner of a reference polygon;
    calculating a similarity indicator on the basis of the calculated similarity of the internal angles of all corners of the polygon of the detected cycle; and
    setting the detected cycle as a traffic circle in the digital map if the similarity indicator exceeds a predefined threshold.

* * * * *